(12) United States Patent
Hashimoto et al.

(10) Patent No.: US 10,418,887 B2
(45) Date of Patent: Sep. 17, 2019

(54) STATOR ASSEMBLY METHOD AND STATOR ASSEMBLY APPARATUS

(71) Applicant: AISIN AW CO., LTD., Anjo-shi, Aichi-ken (JP)

(72) Inventors: Shingo Hashimoto, Okazaki (JP); Shingo Sato, Okazaki (JP)

(73) Assignee: AISIN AW CO., LTD., Anjo (JP)

( * ) Notice: Subject to any disclaimer, the term of this patent is extended or adjusted under 35 U.S.C. 154(b) by 295 days.

(21) Appl. No.: 15/539,432

(22) PCT Filed: Dec. 28, 2015

(86) PCT No.: PCT/JP2015/086548
§ 371 (c)(1),
(2) Date: Jun. 23, 2017

(87) PCT Pub. No.: WO2016/129197
PCT Pub. Date: Aug. 18, 2016

(65) Prior Publication Data
US 2018/0091029 A1 Mar. 29, 2018

(30) Foreign Application Priority Data
Feb. 13, 2015 (JP) .................. 2015-026133

(51) Int. Cl.
*H02K 15/00* (2006.01)
*H02K 15/06* (2006.01)
*H02K 15/04* (2006.01)

(52) U.S. Cl.
CPC ....... *H02K 15/066* (2013.01); *H02K 15/0428* (2013.01); *Y10T 29/49009* (2015.01)

(58) Field of Classification Search
CPC .............. H02K 15/066; H02K 15/0428; Y10T 29/49009; Y10T 29/49073
USPC ..................................................... 29/597, 606
See application file for complete search history.

(56) References Cited

U.S. PATENT DOCUMENTS

| 7,337,525 B2 * | 3/2008 | Ueda .................. H02K 15/0037 29/596 |
| 9,071,116 B2 * | 6/2015 | Stephenson .......... H02K 15/066 |
| 2009/0001841 A1 | 1/2009 | Naganawa et al. |
| 2013/0000105 A1 | 1/2013 | Hasegawa et al. |

FOREIGN PATENT DOCUMENTS

| JP | H07-75297 A | 3/1995 |
| JP | 2009-11116 A | 1/2009 |
| JP | 2011-193597 A | 9/2011 |

OTHER PUBLICATIONS

Mar. 15, 2016 Search Report issued in International Patent Application No. PCT/JP2015/086548.

\* cited by examiner

*Primary Examiner* — Donghai D Nguyen
(74) *Attorney, Agent, or Firm* — Oliff PLC

(57) ABSTRACT

A stator assembly method includes a step of inserting coils into slots by pressing coil end portions of the coils from the inner peripheral side toward the radially outer side of a stator core using a pressing member while suppressing fall of the coil end portions by supporting the coil end portions from the radially outer side of the stator core using a fall suppression member.

20 Claims, 8 Drawing Sheets

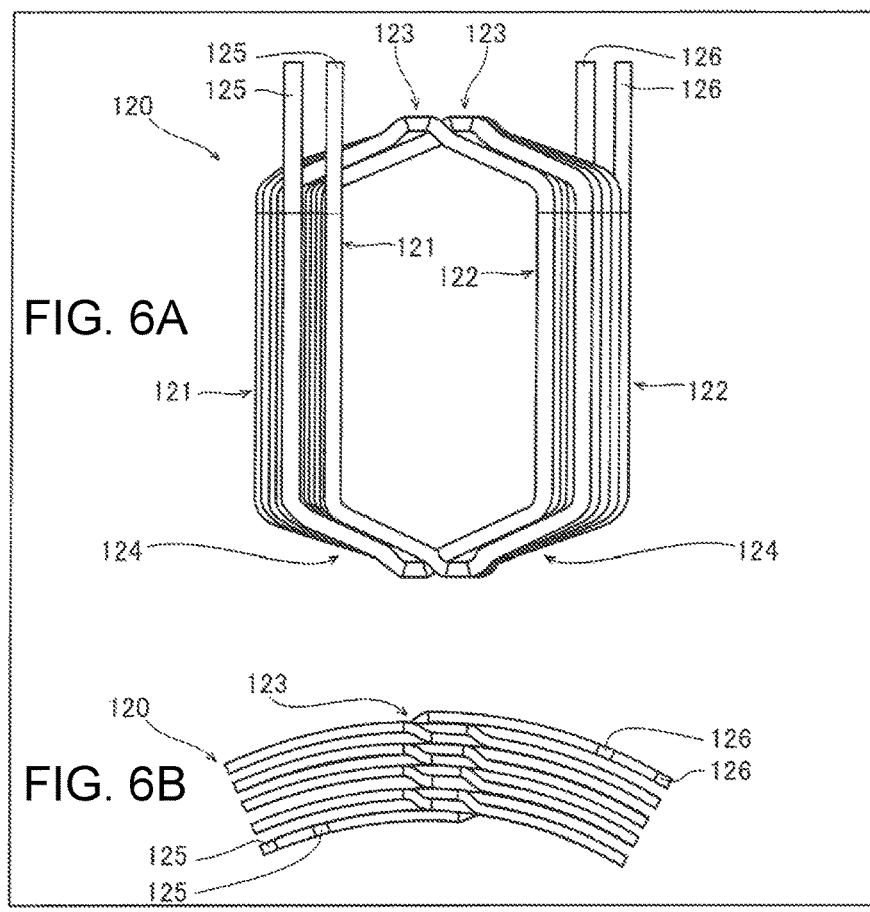
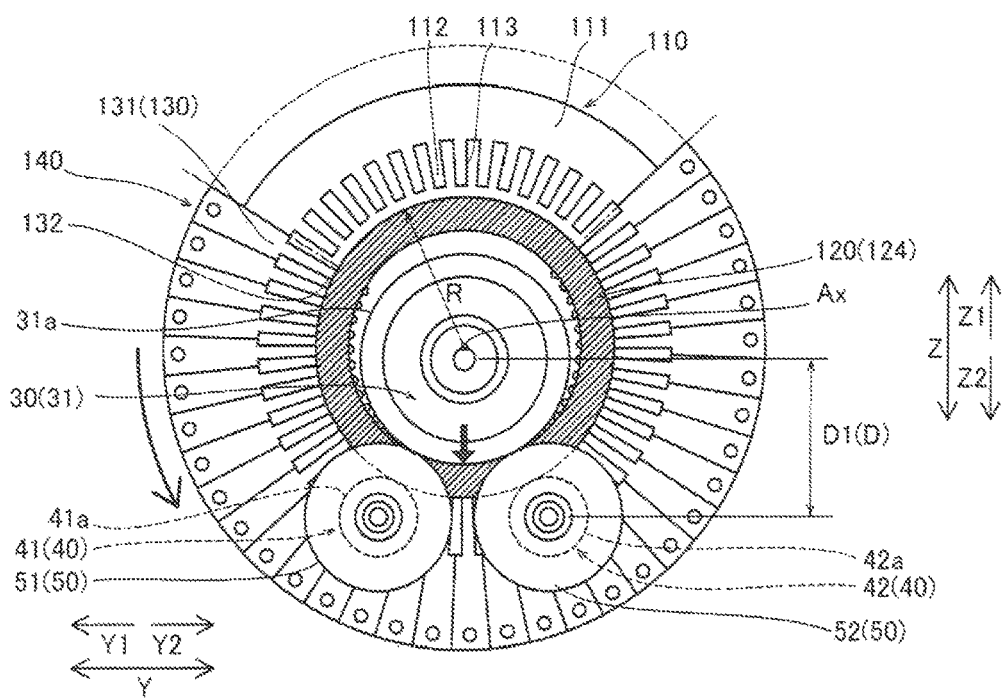

FIG. 8
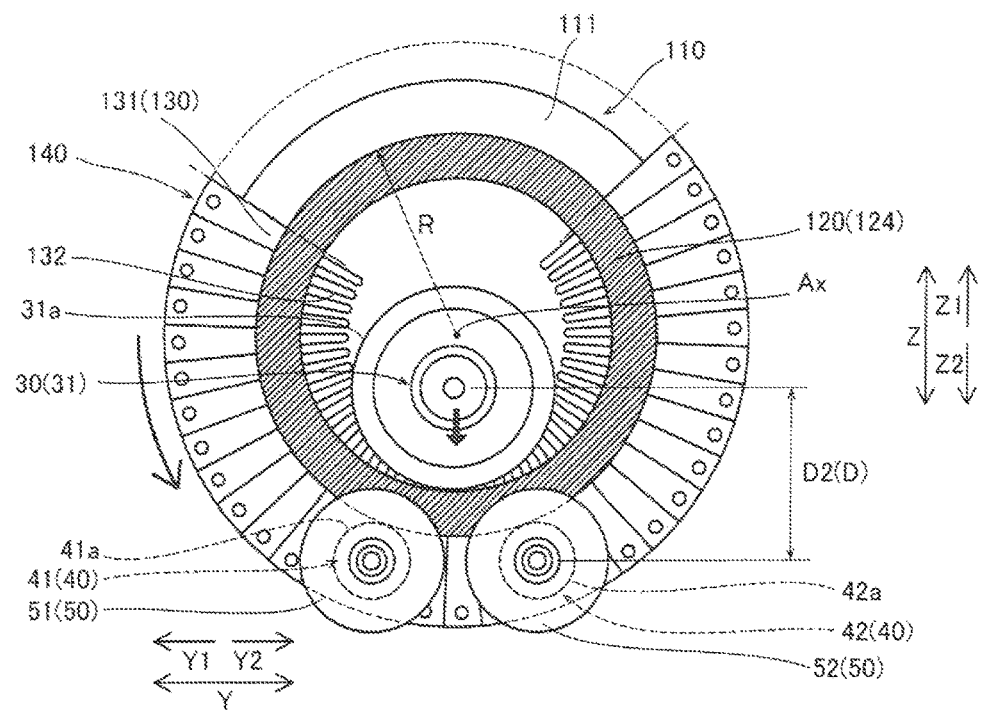
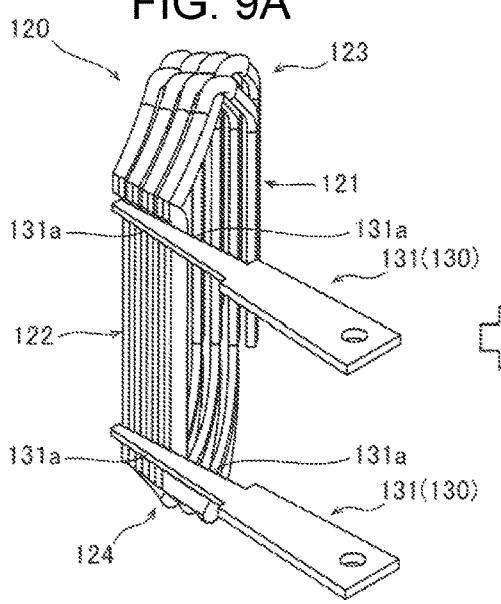
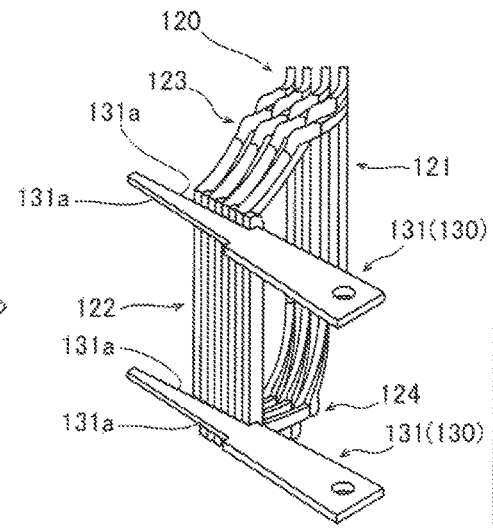

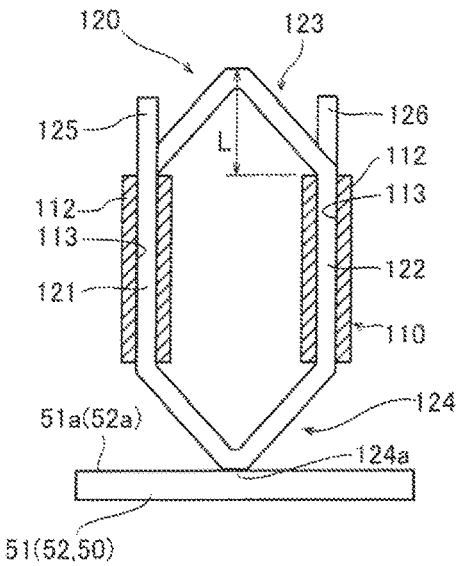
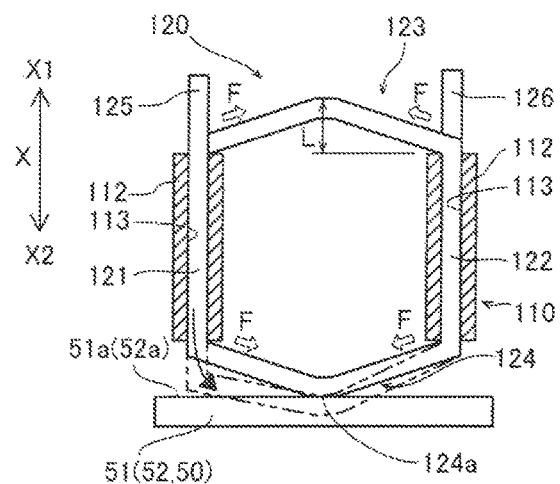
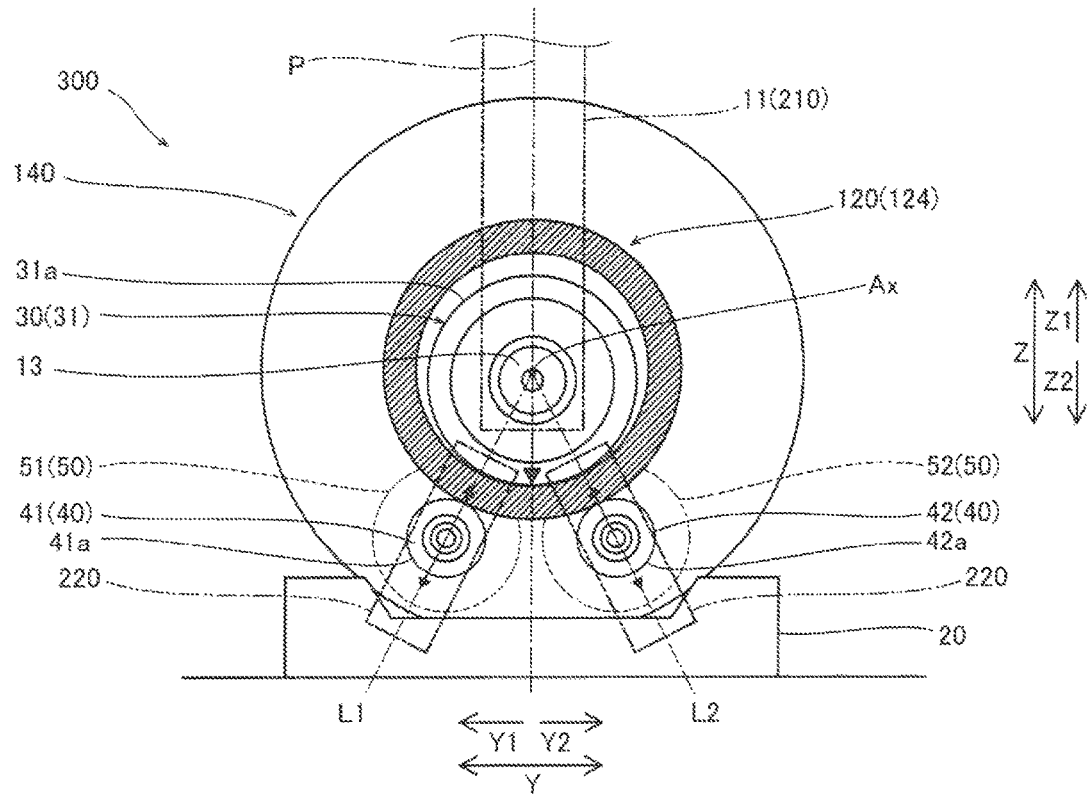

STATOR ASSEMBLY METHOD AND STATOR ASSEMBLY APPARATUS

BACKGROUND

The present disclosure relates to a stator assembly method and a stator assembly apparatus, and in particular to a stator assembly method and a stator assembly apparatus in which coils are moved from the inner peripheral side toward the radially outer side of a stator core to be inserted into slots.

Hitherto, there has been known a stator assembly method in which coils are moved from the inner peripheral side toward the radially outer side of a stator core to be inserted into slots. Such a stator assembly method is disclosed in Japanese Patent Application Publication No. 2011-193597 (JP 2011-193597 A), for example.

JP 2011-193597 A discloses a stator assembly method in which a jig is disposed on the inner peripheral side of a stator core with coils mounted to holding grooves of the jig with the same pitch as that of slots of the stator core and the coils are moved radially outward to be inserted from the holding grooves into the slots. More particularly, the entire coils are moved from the holding grooves toward the slots (radially outward) with a pushing device pressing coil end portions of the coils radially outward while a pressing device is pressing the coil end portions of the coils in the axial direction to increase the width of the coils, which are annular, in the circumferential direction (while collapsing the coil end portions in the axial direction).

With the assembly method according to JP 2011-193597 A, it is difficult to control the direction in which the coil end portions are collapsed when the pressing device presses the coil end portions in the axial direction, and therefore the shape of the coil end portions after the assembly disadvantageously tends to be non-uniform because the coil end portions collapse so as to fall in the radial direction. Individual coils have a dimensional difference due to manufacturing variability. Therefore, with the assembly method according to JP 2011-193597 A, the pressing device may disadvantageously collapse (deform) coils having relatively large coil end portions more than necessary. With the assembly method according to JP 2011-193597 A, in addition, the entire coil end portions are deformed by the pressing device so as to be collapsed, and therefore the coils (coil end portions) disadvantageously tend to be damaged when pressed against the stator core.

Therefore, from the viewpoint of suppressing variations in shape of the coil end portions and suppressing damage to the coil end portions, it is desirable if the coils can be assembled to the stator core without pressing the coil end portions in the axial direction to be deformed (collapsed) during assembly.

SUMMARY

In the case where the coils are assembled by only pressing the coil end portions radially outward without pressing the coil end portions in the axial direction to be deformed, however, a large pressing force directed radially outward acts on only the coil end portions when the coils are inserted into the slots. For slot housed portions of the coils to be inserted into the slots, meanwhile, a friction force is generated between the slot housed portions and members (guide jigs or side surfaces of teeth of the stator core) that guide the slot housed portions during insertion of the coils to hinder the insertion. As a result, the entire coils are warped into an arcuate shape because the amount of movement of the slot housed portions, which are at the center in the axial direction, toward the radially outer side (into the slots) is smaller than that of the coil end portions, which are on both the outer sides in the axial direction, and therefore the coil end portions may fall radially outward. As a result, the shape of the coil end portions after the assembly may be non-uniform.

An exemplary aspect of the disclosure provides a stator assembly method and a stator assembly apparatus that enable suppressing fall of coil end portions toward the radially outer side during assembly of coils to a stator core in the case where the coils are assembled by pressing the coil end portions radially outward.

An exemplary stator assembly method includes disposing a plurality of coils combined with each other on an inner peripheral side of an annular stator core, the coils each having slot housed portions to be housed in slots provided in an inner periphery of the annular stator core, and coil end portions to be disposed outside of end surfaces of the stator core in an axial direction in which a center axis of the annular stator core extends; and inserting the coils into the slots by pressing the coil end portions of the coils from the inner peripheral side toward a radially outer side of the stator core using a presser while suppressing fall of the coil end portions by supporting the coil end portions of the coils from the radially outer side of the stator core using a fall suppressor when the coils are inserted into the slots while increasing a clearance between the slot housed portions by pressing the coil end portions of the coils, which are disposed on the inner peripheral side of the stator core, from the inner peripheral side toward an outer peripheral side of the stator core using the presser.

As described above, the stator assembly method according to the first exemplary aspect of the present disclosure includes inserting the coils, which are disposed on the inner peripheral side of the stator core, into the slots by pressing the coil end portions of the coils from the inner peripheral side toward the radially outer side of the stator core using the presser while suppressing fall of the coil end portions by supporting the coil end portions from the radially outer side of the stator core using the fall suppressor. Consequently, the fall suppressor can suppress fall of the coil end portions toward the radially outer side even in the case where a large force directed radially outward is applied to the coil end portions by the presser during assembly. As a result, it is possible to suppress fall of the coil end portions toward the radially outer side during assembly of the coils to the stator core in the case where the coils are assembled by pressing the coil end portions radially outward.

An exemplary stator assembly apparatus includes a presser that presses coil end portions of a plurality of coils combined with each other from an inner peripheral side toward a radially outer side of an annular stator core to insert the coils into slots while increasing a clearance between slot housed portions, the coils each having the slot housed portions to be housed in the slots provided in an inner periphery of the annular stator core, and the coil end portions to be disposed outside of end surfaces of the stator core in an axial direction in which a center axis of the annular stator core extends; and fall suppressors that suppress fall of the coil end portions by supporting the coil end portions from the radially outer side when the coil end portions are pressed radially outward by the presser.

As described above, the stator assembly apparatus according to the second exemplary aspect of the present disclosure is provided with the fall suppressors which suppress fall of the coil end portions by supporting the coil end portions from the radially outer side when the coil end portions are pressed radially outward by the presser. Consequently, the fall suppressors can suppress fall of the coil end portions toward the radially outer side even in the case where a large force directed radially outward is applied to the coil end portions by the presser during assembly. As a result, it is possible to suppress fall of the coil end portions toward the radially outer side during assembly of the coils to the stator core in the case where the coils are assembled by pressing the coil end portions radially outward.

According to the present disclosure, as described above, it is possible to suppress fall of the coil end portions toward the radially outer side during assembly of the coils to the stator core in the case where the coils are assembled by pressing the coil end portions radially outward.

BRIEF DESCRIPTION OF THE DRAWINGS

FIGS. 6A and 6B are a perspective view and a top view, respectively, of two coils of the same phase, slot housed portions of which are to be housed in the same slots of the stator core.

FIG. 7 is a schematic diagram illustrating the positional relationship of various portions at the time when the assembly of the coils to the stator core is started.

FIG. 8 is a schematic diagram illustrating the positional relationship of various portions at the time when the assembly of the coils to the stator core is ended.

FIGS. 9A and 9B are schematic views illustrating the positional relationship between the coil housed portions and guide jigs in the state before the coils are inserted and the positional relationship between the coil housed portions and the guide jigs in the state after the coils are inserted, respectively.

FIGS. 10A and 10B are schematic views illustrating the shape of the coils for a case where the coils are positioned on the distal end side of teeth and the shape of the coils for a case where the coils are inserted to the root side of the teeth.

FIG. 11 is a schematic side view illustrating the structure of a stator assembly apparatus according to a second embodiment of the present disclosure.

DETAILED DESCRIPTION OF EMBODIMENTS

Embodiments of the present disclosure will be described below with reference to the drawings.

First Embodiment (Structure of Stator Assembly Apparatus)

The structure of an assembly apparatus 100 for a stator 200 (see FIG. 5) according to a first embodiment will be described with reference to FIGS. 1 to 5.

Figure 1:
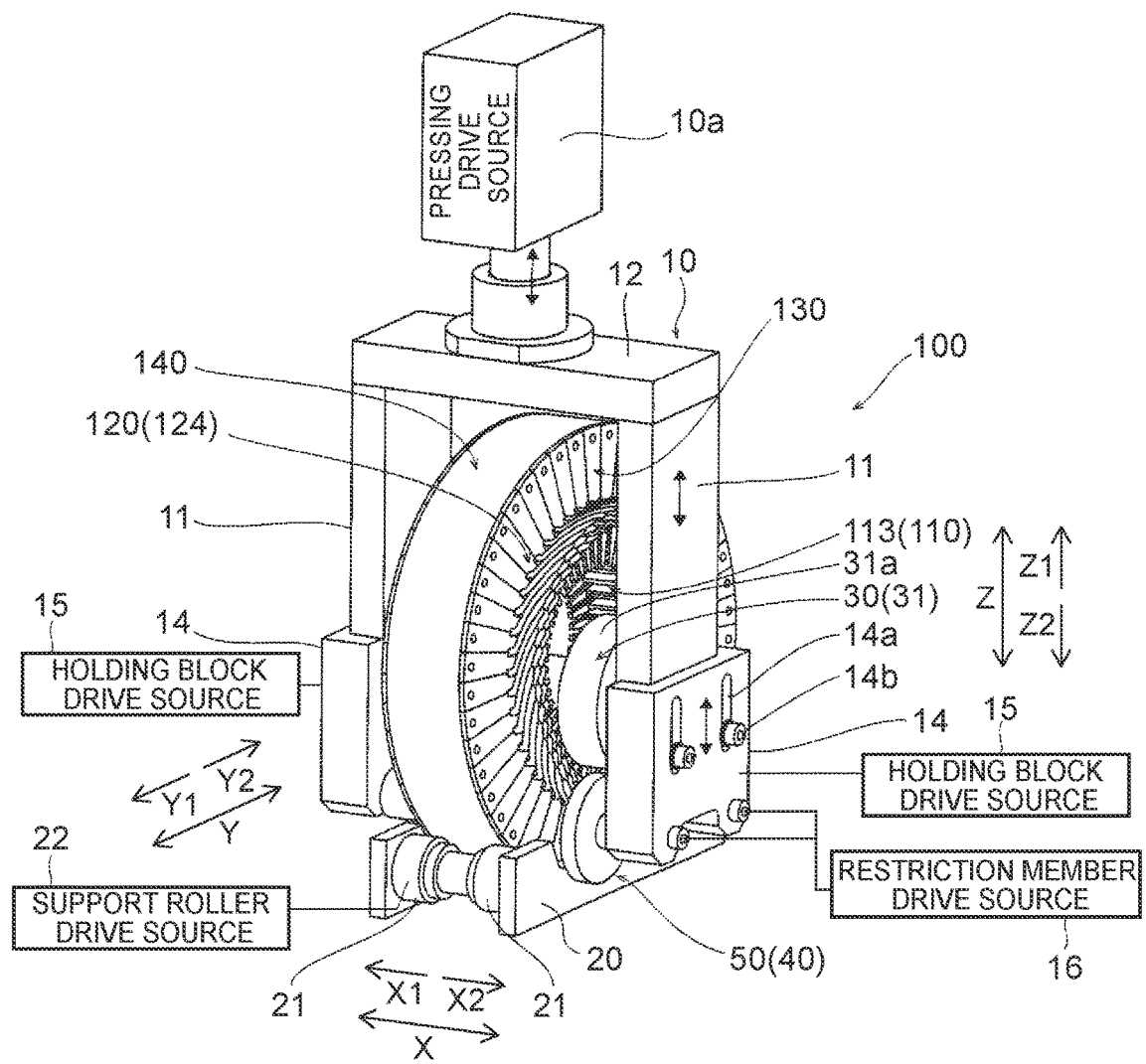
FIG. 1 is a perspective view of a stator assembly apparatus according to a first embodiment of the present disclosure.
Figure 2:
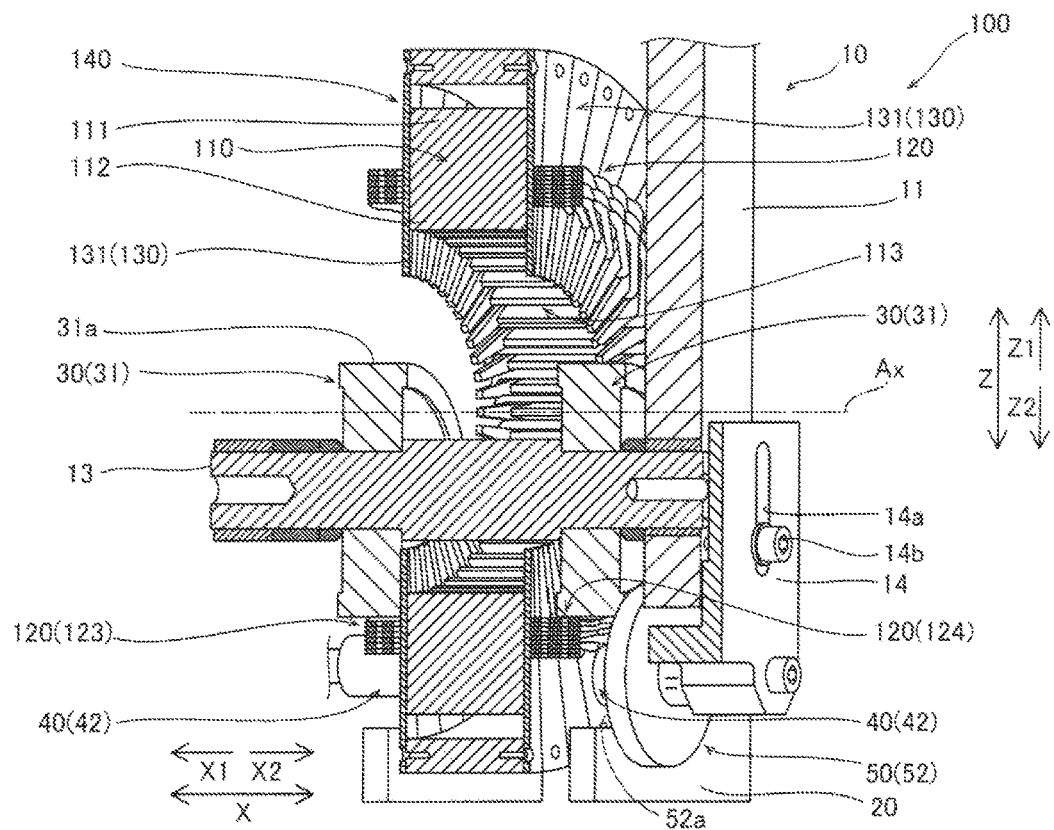
FIG. 2 is a partially perspective sectional view of the stator assembly apparatus according to the first embodiment of the present disclosure.

As illustrated in FIGS. 1 and 2, the assembly apparatus 100 for the stator 200 is an apparatus that assembles coils 120 (see FIG. 2) to a stator core 110 (see FIG. 2). In the first embodiment, a coil assembly 140 is set to the assembly apparatus 100. The coil assembly 140 includes the stator core 110, a jig 130 attached to the stator core 110, and the coils 120 which are attached to the jig 130. The assembly apparatus 100 is configured to insert the coils 120, which are held by the jig 130 in the coil assembly 140, into slots 113 of the stator core 110.

The assembly apparatus 100 includes a pushing device 10 that pushes the coils 120 of the coil assembly 140, and a support base 20 that supports the coil assembly 140.

The pushing device 10 includes a pair of arm portions 11 disposed on both sides of the coil assembly 140 in the axial direction (X direction in which a center axis Ax (see FIG. 2) of the stator core 110 extends), and a beam portion 12 that connects between the upper end portions of the pair of arm portions 11.

In the first embodiment, the pushing device 10 includes two pressing members 30 (i.e., pressers). The two pressing members 30 include two pressing rollers 31 each having a circular outer peripheral surface 31a. As illustrated in FIG. 2, the two pressing rollers 31 are disposed on both sides of the coil assembly 140 in the axial direction. In addition, the two pressing rollers 31 are attached to a shaft member 13, both ends of which are rotatably supported by the pair of arm portions 11. Consequently, the two pressing rollers 31 are rotatably supported by the pair of arm portions 11 via the shaft member 13. The two pressing rollers 31 are disposed at positions corresponding to coil end portions 123 and 124 on one side and the other side, respectively, of the coil assembly 140 in the axial direction.

The pressing members 30 (pressing rollers 31) are configured to insert the coils 120 into the slots 113 while increasing the clearance between slot housed portions 121 and 122 (see FIG. 6) by pressing the coil end portions 123 and 124 of the coils 120 from the inner peripheral side toward the radially outer side of the stator core 110. More particularly, the pushing device 10 is configured to be movable in the up-down direction (Z direction) by a pressing drive source 10a (pressing mechanism), and the pressing rollers 31 are moved in the up-down direction (radial direction of the stator core 110, Z direction) along with movement of the pushing device 10. The pressing rollers 31 press the coil end portions 123 (124) from the inner peripheral side toward the radially outer side of the stator core 110 by moving radially outward (in the Z2 direction) with the pressing rollers 31 disposed on the inner peripheral side (radially inner side) of the coil assembly 140.

In the first embodiment, as illustrated in FIG. 2, the pushing device 10 includes fall suppression members 40 (i.e., fall suppressors). The fall suppression members 40 are disposed at the lower end portions of the pair of arm portions 11 of the pushing device 10. The fall suppression members 40 are attached to a pair of holding blocks 14 provided at the lower end portions of the pair of arm portions 11. The fall suppression members 40 are disposed at positions on the radially outer side with respect to the coil end portions 123 on one side of the coil assembly 140 and the coil end portions 124 on the other side of the coil assembly 140.

The fall suppression members 40 are configured to be moved radially outward while supporting the coil end portions 123 (124) along with movement of the pressing members 30 toward the radially outer side during pressing. Specifically, the fall suppression members 40 are disposed at positions at which the fall suppression members 40 contact (support) the coil end portions 123 (124) from the radially outer side. In addition, the fall suppression members 40 are attached to the arm portions 11 of the pushing device 10 via the holding blocks 14. Therefore, the pressing members 30 and the fall suppression members 40 are moved radially outward along with movement of the pushing device 10 (arm portions 11) in the up-down direction (movement toward the radially outer side).

In addition, the fall suppression members 40 are each configured to make a clearance D (see FIG. 3) between the pressing member 30 and the fall suppression member 40 different in accordance with variations in shape (outside diameter) of the coils 120 to be inserted into the slots 113 along with movement of the pressing member 30 toward the radially outer side. Here, the holding blocks 14 are each attached to the arm portion 11 by long holes 14a that extend in the up-down direction and coupling members 14b to be coupled to the arm portion 11 so as to be changeable in relative position in the up-down direction with respect to the arm portions 11. The holding blocks 14 are each configured to be relatively movable in the up-down direction with respect to the arm portion 11 by a holding block drive source 15. The positions of the holding blocks 14 in the up-down direction are adjusted such that the fall suppression members 40 are disposed at positions at which the fall suppression members 40 contact the coil end portions 123 (124) from the radially outer side. Consequently, the fall suppression members 40 each change the clearance D in the radial direction between the pressing member 30 and the fall suppression member 40 in accordance with movement of the holding block 14.

Figure 3:
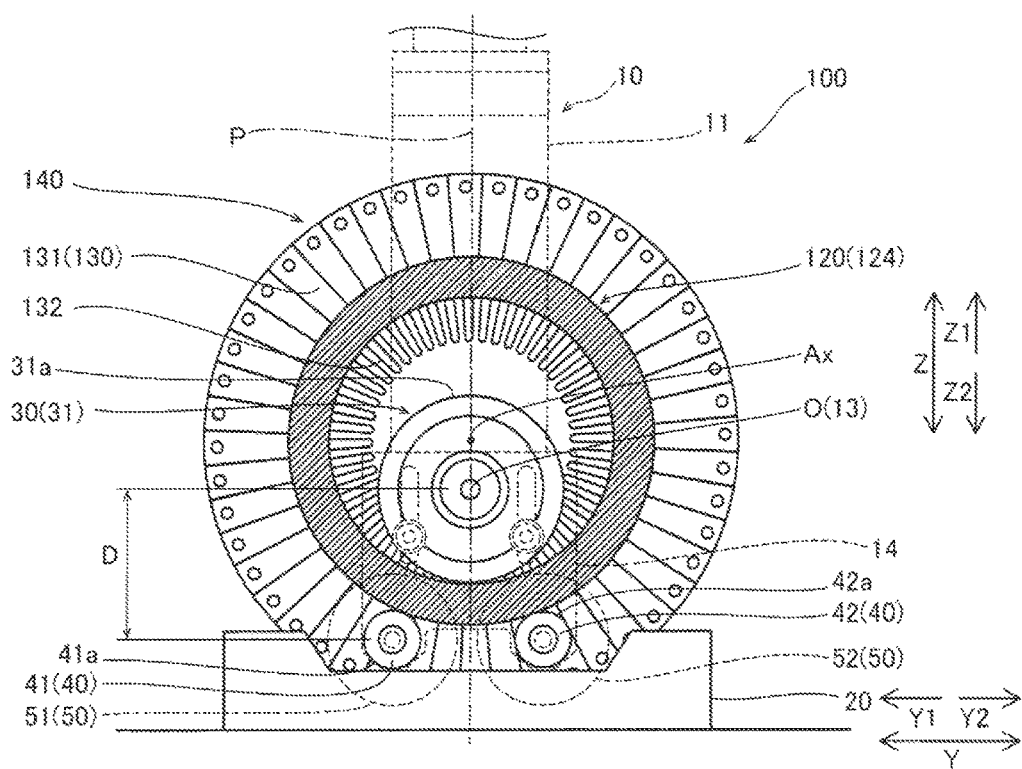
FIG. 3 is a schematic side view of the stator assembly apparatus of FIG. 1 as seen in a direction in which the center axis of a stator core extends.

As illustrated in FIG. 3, the fall suppression members 40 each include fall suppression rollers 41 and 42 that have a circular outer peripheral surface 41a (42a). Each of the holding blocks 14 is provided with two fall suppression rollers 41 and 42. The fall suppression rollers 41 and 42 are attached to the holding block 14 so as to be rotatable. The fall suppression rollers 41 and 42 are an example of the "first fall suppression roller" and the "second fall suppression roller", respectively, according to the present disclosure.

The fall suppression roller 41 is disposed on one side (on the Y1 direction side) with respect to a line segment P that passes through a center of rotation O of the pressing member 30 and that extends in a pressing direction (Z2 direction) in which the pressing member 30 presses the coil end portions 123 (124). The fall suppression roller 42 is disposed on the other side (on Y2 direction side) with respect to the line segment P.

Figure 4:
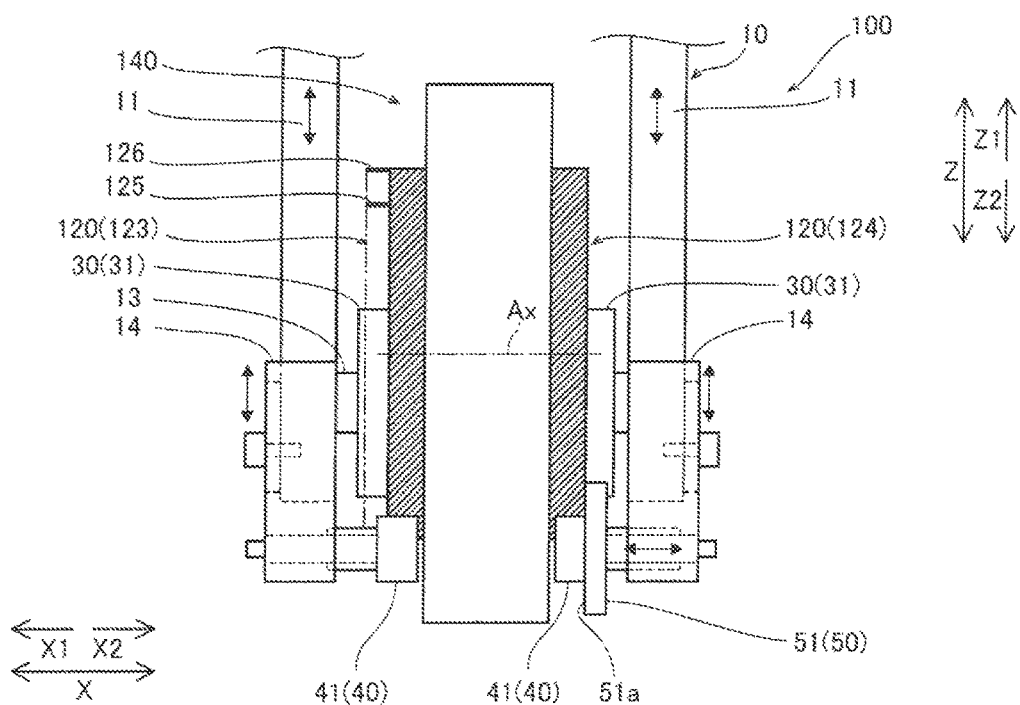
FIG. 4 is a schematic side view of the stator assembly apparatus of FIG. 1 as seen in a direction that is orthogonal to the center axis of the stator core.

As illustrated in FIG. 4, the assembly apparatus 100 also includes movement restriction members 50 for the coil end portions 124. The movement restriction members 50 are disposed on the outer side of the coil end portions in the axial direction so as to restrict movement of the coil end portions 124, which are on the opposite side of the coils 120 from lead wire portions 125 (126), toward the outer side in the axial direction when the coil end portions 124 are pressed radially outward by the pressing members 30.

The movement restriction members 50 are disposed at positions on the outer side in the axial direction with respect to the coil end portions 124 which are on the opposite side from the lead wire portions 125 (126). The movement restriction members 50 each have a flat outer surface 51a that faces the coil end portions 124 in the axial direction and that extends in the radial direction. In the first embodiment, the movement restriction members 50 are formed integrally with the respective fall suppression members 40. Specifically, the movement restriction members 50 are circular flange-like portions 51 and 52 formed integrally with the fall suppression rollers 41 and 42, respectively, and having an outside diameter that is larger than the outer peripheral surfaces of the fall suppression rollers 41 and 42. The flange-like portion 51 and the flange-like portion 52 have a flat outer surface 51a and a flat outer surface 52a (see FIG. 2), respectively, that extend in the radial direction. The fall suppression members 40 which support the coil end portions 123 on the lead wire portion 125 (126) side are not provided with the flange-like portions 51 (52), but are provided with only the fall suppression rollers 41 (42).

The movement restriction members 50 are configured to be moved radially outward along with movement of the pressing members 30 toward the radially outer side during pressing. That is, the movement restriction members 50, which are formed integrally with the fall suppression members 40, are moved radially outward along with movement of the pushing device 10 (arm portions 11) in the up-down direction or relative movement of the holding blocks 14 with respect to the arm portions 11 in the up-down direction (movement toward the radially outer side).

In addition, the movement restriction members 50 are configured to be movable also in the axial direction (X direction) in accordance with variations in amount of projection in the axial direction (X direction) of the coil end portions 124 from the stator core 110 at the time when the coils 120 are inserted into the slots 113. Specifically, the movement restriction members 50 are configured to be movable in the axial direction by a restriction member drive source 16.

The support base 20 is configured to support the lower surface side of the coil assembly 140. The support base 20 includes support rollers 21 that support the outer peripheral surface of the coil assembly 140, and a support roller drive source 22 that rotates the support rollers 21. Consequently, the support base 20 is configured to be able to rotate the coil assembly 140 about the center axis Ax by rotating the support rollers 21 while supporting the lower surface side of the coil assembly 140 using the support rollers 21. During assembly of the coils 120, the pressing rollers 31 and the fall suppression rollers 41 and 42 are rotated along with rotation of the coil assembly 140 (stator core 110) about the center axis Ax.

(Structure of Coil Assembly)

Next, the structure of various portions of the coil assembly 140 will be described with reference to FIGS. 2 to 6.

Figure 5:
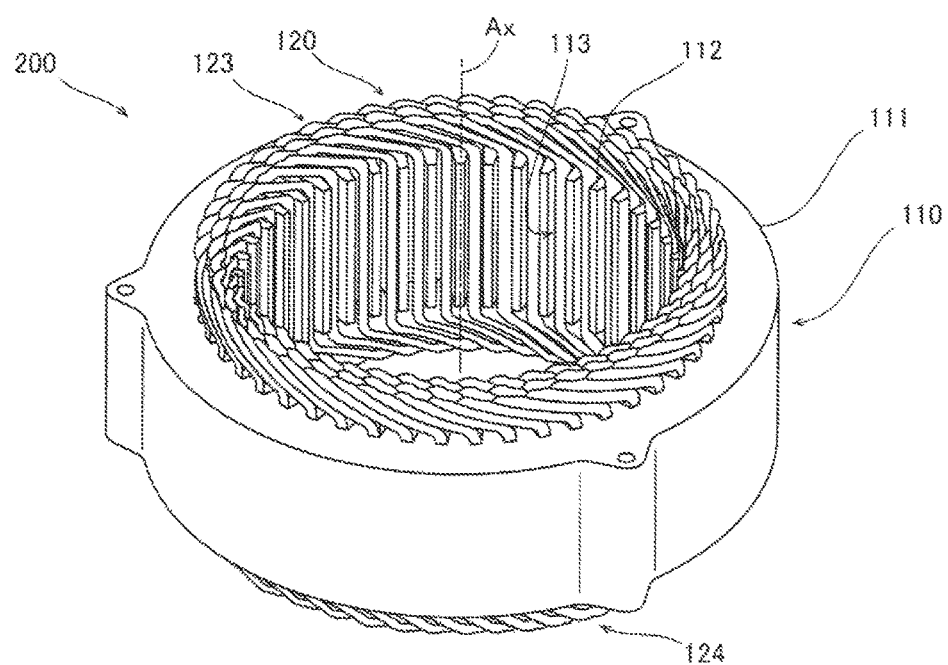
FIG. 5 is a perspective view illustrating a stator after assembly.

As illustrated in FIGS. 2 and 5, the stator core 110 has an annular shape. More particularly, the stator core 110 includes an annular back yoke 111 and a plurality of teeth 112 that extend radially inward (toward the center axis Ax) from the back yoke 111. The teeth 112 are disposed at equal intervals along the circumferential direction of the stator core 110. A slot 113 that holds the coil 120 is formed between two adjacent teeth 112. A plurality of slots 113 are arranged circumferentially in the inner periphery of the stator core 110.

As illustrated in FIG. 6, the coil 120 is constituted of a rectangular conductive wire that has a rectangular cross section, and formed in an annular shape by winding the rectangular conductive wire a plurality of times (e.g. five times) to be shaped into a predetermined shape.

The coil 120 includes: the slot housed portions 121 and 122 to be housed in the slots 113 which are provided in the inner periphery of the annular stator core 110; the coil end portions 123 and 124 which are disposed outside the slots 113 in the axial direction in which the center axis Ax (see FIG. 4) of the annular stator core 110 extends; and the lead wire portions 125 and 126 which extend from the slot housed portions 121 and 122, respectively.

The slot housed portions 121 and 122 are formed in a generally linear shape, and disposed in the separate slots 113 to extend along the axial direction. The coil end portions 123 and 124 are formed to be bent in a generally triangular shape, and connect between end portions of the slot housed portions 121 and 122 which are spaced from each other in the circumferential direction. The coil end portions 123 and 124 are disposed, with respect to the stator core 110, so as to project outward in the axial direction from both end portions (both end surfaces) of the stator core 110 in the axial direction. The lead wire portions 125 and 126 are one end (a winding start portion) and the other end (a winding end portion), respectively, of a rectangular conductive wire wound a plurality of times. Both the lead wire portions 125 and 126 are disposed on one side of the coil 120 in the axial direction (on the X1 direction side in FIG. 4), and drawn to the outside of the stator core 110.

A plurality of coils 120 are disposed in the circumferential direction in the slots 113 of the stator 200. The plurality of coils 120 are arranged circumferentially so as to form an annular shape that extends along the inner periphery of the stator core 110 as a whole. In the first embodiment, the coils 120 are mounted to the stator core 110 so as to be wound concentrically and achieve the following (A) to (C).

(A) The plurality of coils 120 are disposed so as to be housed in the slots 113 as displaced one by one in the circumferential direction. (B) Two coils 120 that are adjacent to each other in the circumferential direction are assembled such that the rectangular conductive wires thereof alternately overlap each other in the stacking direction (radial direction). (C) Two coils 120 of the same phase disposed a predetermined distance away from each other in the circumferential direction are assembled such that the rectangular conductive wires of the slot housed portions 121 of one of the two coils 120 and the rectangular conductive wires of the slot housed portions 122 of the other of the two coils 120 are arranged side by side alternately in the stacking direction (radial direction) in the same slot 113.

In the case where the stator 200 is applied to a three-phase AC motor, for example, the coils 120 of the same phase mean the coils 120 of any of U-phase, V-phase, and W-phase. In this case, the coil assembly 140 includes two coils 120 of the same phase arranged side by side in the circumferential direction for each of U-phase, V-phase, and W-phase.

As illustrated in FIG. 2, the jig 130 is fixed to the stator core 110, and configured to include a plurality of guide jigs 131 illustrated in FIG. 2, for example. The guide jigs 131 each include a guide portion 131a (see FIG. 9) that guide the slot housed portions 121 (122) into the slot 113, and have a wedge shape that is tapered toward the distal end. The guide portions 131a (see FIG. 9) each serve as edge portions on both sides in the circumferential direction, at the tapered distal end portions, and are formed in a linear shape that extends along the radial direction. The plurality of guide jigs 131 are arranged along the circumferential direction so as to overlap the teeth 112 of the stator core 110 in the axial direction at both end portions of the stator core 110 in the axial direction. In addition, the guide jigs 131 are provided such that the tapered distal end portions are positioned on the radially inner side with respect to the distal ends of the teeth 112. That is, the coil assembly 140 has a structure in which the teeth 112 of the stator core 110 (the slots 113 between the teeth 112) are extended radially inward by the guide jigs 131. Two adjacent guide jigs 131 form an extended slot portion 132 (see FIG. 3) at a position on the radially inner side with respect to the surfaces of the teeth of the stator core 110 by extending the associated slot 113.

The coils 120 are assembled to the extended slot portions 132 which are formed by the guide jigs 131 in the coil assembly 140 so as to achieve the arrangement rules discussed above. Consequently, when each coil 120 which is disposed in the extended slot portion 132 is moved radially outward, the slot housed portions 121 or 122 of the coil 120 are guided (see FIG. 9) radially outward along the guide portions 131a so as to be inserted into the associated slot 113.

(Stator Assembly Method)

An assembly method for the stator 200 will be described with reference to FIGS. 1 to 10. FIGS. 1 to 4 and 8 illustrate a state after the coils 120 are inserted into the slots 113 of the stator core 110. FIG. 7 illustrates a state at the time of start of a step of inserting the coils 120 into the slots 113.

<Step of Disposing Coils on Inner Peripheral Side of Stator Core>

First, the coils 120 are disposed on the inner peripheral side of the stator core 110. That is, the coil assembly 140 is assembled by combining the stator core 110, the plurality of coils 120, and the jig 130. Specifically, the plurality of coils 120 which are constituted from rectangular conductive wires are first combined circumferentially. The plurality of guide jigs 131 are then attached to the plurality of coils 120 which are combined with each other. The guide jigs 131 are each attached to a corresponding one of the coils 120 by inserting the distal end portion between the slot housed portions 121 of one of two coils that are adjacent to each other and the slot housed portions of the other of the two coils. As a result, the coils 120 are set (see FIG. 7) to the extended slot portions 132 which are formed by adjacent guide jigs 131, and the slot housed portions 121 or 122 (see FIG. 6) of each coil 120 are disposed at positions on the radially inner side with respect to the slot 113. In addition, the coils 120 are disposed such that the coil end portions 123 and 124 of the coils 120 project to the outside in the axial direction from both end surfaces of the stator core 110 (and the guide jigs 131) in the axial direction. The lead wire portions 125 and 126 of the coils 120 are disposed on one side in the axial direction (on the X1 direction side).

<Step of Disposing Coil Assembly in Assembly Apparatus>

Next, as illustrated in FIG. 1, the coil assembly 140 which has been assembled is placed on the support rollers 21 of the support base 20 of the assembly apparatus 100. In addition, the shaft member 13 to which the pressing members 30 (pressing rollers 31) have been attached is inserted into the inner peripheral side of the coil assembly 140 so that both ends of the shaft member 13 are attached to the pair of arm portions 11 of the pushing device 10. Consequently, the pressing members 30 (pressing rollers 31) are disposed on the inner peripheral side of the coil assembly 140. By adjusting the position of the pushing device 10 in the up-down direction, the pressing members 30 (pressing rollers 31) are each disposed at a position (see FIG. 7) at which the pressing direction side (radially outer side, downward direction) of the outer surface thereof abuts against the surfaces of the coil end portions 123 (124) on the radially inner side.

In this state, the holding blocks 14 to which the fall suppression members 40 (fall suppression rollers 41 and 42) have been attached are attached to the pair of arm portions 11 of the pushing device 10. In this event, by adjusting the positions of the holding blocks 14 in the up-down direction, the fall suppression members 40 (fall suppression rollers 41 and 42) are each disposed at a position at which the outer surface thereof abuts against the surfaces of the coil end portions 123 (124) on the radially outer side. As a result, as illustrated in FIG. 7, the pressing roller 31 on the radially inner side and the fall suppression rollers 41 and 42 on the radially outer side are disposed so as to interpose the coil end portions 123 (124) in the radial direction. In FIGS. 7 and 8, for convenience of illustration, some of the guide jigs 131 of the coil assembly 140 have been removed to expose the stator core 110.

<Step of Inserting Coils into Slots>

Next, the coils 120 are inserted into the slots 113 by driving the pushing device 10 and the support base 20 (see FIG. 3). When the pushing device 10 is moved downward (in the Z2 direction) by the pressing drive source 10a (pressing mechanism) illustrated in FIG. 1, the coil end portions 123 (124) are pressed radially outward (downward) by the pressing members 30 (pressing rollers 31) on the inner peripheral side of the coil assembly 140. When the support rollers 21 of the support base 20 are rotated by the support roller drive source 22 along with the pressing of the coil end portions 123 (124) by the pressing members 30 (pressing rollers 31), the coil assembly 140 is rotated about the center axis Ax. That is, the support rollers 21 relatively move the stator core 110 with respect to the pressing members 30 in the rotational direction about the center axis Ax.

Consequently, the coils 120, the coil end portions 123 (124) of which are pressed radially outward, start moving radially outward from the extended slot portions 132 of the jig 130 toward the slots 113 of the stator core 110.

More specifically, the slot housed portions 121 (122) are moved radially outward along the guide portions 131a of the guide jigs 131, as illustrated in FIGS. 9A and 9B, by pressing the coil end portions 123 (124) radially outward using the pressing members 30. Consequently, the slot housed portions 121 (122) are inserted into the slots 113 while increasing the clearance between the slot housed portions 121 and 122 of the individual coils 120 in the circumferential direction. In the course of the insertion, the guide jigs 131 deform the coils 120 so as to increase the gap between the slot housed portions 121 and 122 in the circumferential direction (width direction) through radial movement of the coils 120 while guiding the coils 120 so as to move the slot housed portions 121 (122) radially outward along the guide portions 131a.

As illustrated in FIG. 7, when the coil assembly 140 is rotated by the support rollers 21 along with the pressing by the pressing members 30 (pressing rollers 31), the coils 120 which are disposed circumferentially are moved toward the slots 113 little by little. The pressing rollers 31 and the fall suppression rollers 41 and 42 are rotated along with rotation of the coil assembly 140 (stator core 110) about the center axis Ax.

In the first embodiment, the fall suppression members 40 (fall suppression rollers 41 and 42) support the coil end portions 123 (124) from the radially outer side to suppress fall of the coil end portions 123 (124) along with movement of the pressing members 30 (pressing rollers 31) toward the radially outer side. While the pressing is continued, the fall suppression rollers 41 and 42 are rotated along with movement of the coil end portions 123 (124) in the rotational direction while supporting the coil end portions 123 (124). The fall suppression members 40 (fall suppression rollers 41 and 42) are moved radially outward along with movement of the pressing members 30 (pressing rollers 31) toward the radially outer side (in the Z2 direction).

Here, as illustrated in FIGS. 7 and 8, an outside diameter R (radius of curvature) of the coil end portions 123 (124) gradually becomes larger along with movement of the coils 120, which are arranged circumferentially, toward the radially outer side. Therefore, the clearance D between the pressing rollers 31 and the fall suppression rollers 41 and 42 is made different by relatively moving the holding blocks 14 downward with respect to the arm portions 11 using the holding block drive source 15. In other words, the relative position (clearance) between the position of the contact point between the pressing rollers 31 and the coil end portions 123 (124) and the position of the contact point between the fall suppression rollers 41 and 42 and the coil end portions 123 (124) is varied in accordance with variations in outside diameter R of the coil end portions 123 (124) (variations in shape of the coil end portions 123 (124)). Specifically, the clearance between the pressing rollers 31 and the fall suppression rollers 41 (42) (clearance between the centers) is D1 at the time of start of the pressing (FIG. 7), and D2 at the time of end of the pressing (FIG. 8) (D2>D1).

In addition, as illustrated in FIG. 10, the clearance between the slot housed portions 121 and 122, which are inserted into the slots 113, in the circumferential direction becomes larger in each of the coils 120 along with movement of the coil 120 toward the radially outer side. Therefore, a tensile force F that pulls both ends of the coil end portions 123 (124) acts on the coil 120. In this event, the lead wire portion 125, which is an end portion of the coil 120, is a free end that is not wound, and therefore the rectangular conductive wire which constitutes the coil end portion 124 on the opposite side from the lead wire portion 125 in the axial direction is pulled by the tensile force F to be moved outward in the axial direction as indicated by the dash-double-dot line in FIG. 10B. In other words, the lead wire portion 125 is pulled in the axial direction in such a direction that the lead wire portion 125 is pulled into the slot 113 (X2 direction) by the coil end portion 124 on the opposite side in the axial direction. The same also applies to the lead wire portion 126 although not illustrated.

At that time, the movement restriction member 50 (see FIG. 4) which is disposed on the coil end portion 124 side receives the coil end portion 124 on the opposite side from the lead wire portions 125 and 126 of the coil 120 at a position on the outer side in the axial direction to restrict movement of the coil end portion 124 in the axial direction indicated by the dash-double-dot line (see FIG. 10B). That is, the movement restriction member 50 receives movement of the coil end portion 124 toward the outer side in the axial direction with the outer surface 51a (52a) contacting a vertex portion 124a of the coil end portion 124.

An intermediate portion, other than the winding start portion or the winding end portion which is directly connected to the lead wire portion 125 or 126, of the rectangular conductive wire which constitutes the coil end portion 124 is wound around the teeth 112 which form the slots 113 with both ends fixed, and therefore is not moved.

In addition, as illustrated in FIGS. 10A and 10B, an amount of projection L of the coil end portion 123 (124) of each of the coils 120 from an end surface of the stator core 110 in the axial direction becomes smaller as a whole along with insertion of the coil 120 into the slots 113. The movement restriction member 50 is moved in the axial direction (in the direction toward the stator core 110) by the restriction member drive source 16 (see FIG. 4) in accordance with variations in amount of projection L of the coil end portion 123 (124) in the axial direction.

As illustrated in FIG. 8, when all the coils 120 are inserted into the slots 113 of the stator core 110, the step of inserting the coils 120 into the slots 113 is finished. The coil assembly 140 is removed from the assembly apparatus 100, and the jig 130 (guide jigs 131) is removed from the stator core 110. As a result, the stator 200 illustrated in FIG. 5 is obtained. The stator 200 is assembled as described above.

Effect of First Embodiment

The following effects can be obtained with the first embodiment.

In the first embodiment, as described above, the coils 120 are inserted into the slots 113 by pressing the coil end portions 123 (124) from the inner peripheral side toward the radially outer side of the stator core 110 using the pressing members 30 while suppressing fall of the coil end portions 123 (124) by supporting the coil end portions 123 (124) of the coils 120, which are disposed on the inner peripheral side of the stator core 110, from the radially outer side of the stator core 110 using the fall suppression members 40. Consequently, the fall suppression members 40 can suppress fall of the coil end portions 123 (124) toward the radially outer side even in the case where a large force directed radially outward is applied to the coil end portions 123 (124) by the pressing members 30 during assembly. As a result, it is possible to suppress fall of the coil end portions 123 (124) toward the radially outer side during assembly of the coils 120 to the stator core 110 in the case where the coils 120 are assembled by pressing the coil end portions 123 (124) radially outward.

In the first embodiment, in addition, as described above, the fall suppression members 40 are configured to be moved radially outward while supporting the coil end portions 123 (124) along with movement of the pressing members 30 toward the radially outer side during pressing. Consequently, the coils 120 to be inserted into the slots 113 by the pressing members 30 can be continuously supported by the fall suppression members 40. As a result, fall of the coil end portions 123 (124) can be continuously suppressed in accordance with movement of the coils 120 during the step of inserting the coils 120 into the slots 113.

In the first embodiment, in addition, as described above, the fall suppression members 40 are each configured to make the clearance D between the pressing member 30 and the fall suppression member 40 different in accordance with variations in outside diameter R (variations in shape) of the coils 120 to be inserted into the slots 113 along with movement of the pressing member 30 toward the radially outer side. Consequently, the relative positional relationship between the pressing member 30 and the fall suppression member 40 can be adjusted so as to achieve an appropriate clearance D that matches the outside diameter R (radius of curvature) of the coils 120 which becomes larger along with insertion of the coils 120 into the slots 113. As a result, it is possible to suppress application of an excessive force to the coil end portions 123 (124) during the step of inserting the coils 120 into the slots 113.

In the first embodiment, in addition, as described above, the pressing rollers 31 which are rotated along with relative movement of the stator core 110 with respect to the pressing members 30 in the rotational direction about the center axis Ax are provided as the pressing members 30, and the fall suppression rollers 41 and 42 which are rotated along with movement of the coil end portions 123 (124) in the rotational direction while supporting the coil end portions 123 (124) are provided as the fall suppression members 40. Consequently, the pressing members 30 and the stator core 110 can be rotated relative to each other using the pressing rollers 31, and thus the structure for pressing the coils 120 can be simplified and downsized compared to a case where pressing members that press the entire periphery of the stator core 110 radially outward at the same time are provided. Therefore, the assembly apparatus 100 can be downsized. In addition, the resistance against contact with the coil end portions 123 (124) can be reduced by rotating the fall suppression rollers 41 and 42 along with movement of the coil end portions 123 (124) in the rotational direction (relative rotation of the stator core 110).

In the first embodiment, in addition, as described above, the assembly apparatus 100 is provided with the fall suppression rollers 41 and the fall suppression rollers 42 such that the fall suppression rollers 41 are disposed on one side with respect to a line segment extending in the direction in which the pressing members 30 press the coil end portions 123 (124) and that the fall suppression rollers 42 are disposed on the other side with respect to the line segment. Consequently, the coil end portions 123 (124) can be supported at a plurality of locations, and thus application of a local load (support force) from the fall suppression members 40 to the coil end portions 123 (124) can be suppressed. In addition, the coils 120 are assembled circumferentially to be connected to each other. Therefore, in the case where the coil end portions 123 (124) fall, not only portions actually pressed by the pressing members 30 but also portions in the vicinity of the pressed portions are possibly pulled to fall. The fall suppression rollers 41 and 42 allows supporting portions in the vicinity of the pressed portions and suppressing fall of the coil end portions 123 (124) in a wide range.

In the first embodiment, in addition, as described above, the pressing rollers 31 which have a circular outer peripheral surface are provided as the pressing members 30, and the fall suppression rollers 41 and 42 which have a circular outer peripheral surface are provided as the fall suppression members 40. Consequently, damage to the coil end portions 123 (124) due to contact with the coil end portions 123 (124) can be suppressed. That is, in the step of inserting the coils 120 into the slots 113, the stator core 110 is relatively moved with respect to the pressing members 30 in the rotational direction about the center axis to gradually insert the coils 120, which are disposed circumferentially, into the slots 113. Therefore, the contact resistance can be reduced by the pressing rollers 31 and the fall suppression rollers 41 and 42 rotating in accordance with the relative movement in the rotational direction, and thus damage to the coil end portions 123 (124) can be suppressed.

In the first embodiment, in addition, as described above, the assembly apparatus 100 is configured such that the slot housed portions 123 (124) are inserted into the slots 113 while increasing the clearance in the circumferential direction between the slot housed portions 121 and 122 by pressing the coil end portions 123 (124) radially outward using the pressing members 30 and by moving the slot housed portions 121 (122) radially outward along the guide portions 131a of the guide jigs 131. Consequently, the slot housed portions 123 (124) can be reliably guided into the slots 113 by the guide jigs 131. In addition, when the slot housed portions 121 (122) are moved along the guide portions 131 a, the coils 120 can be gradually deformed while suppressing application of an excessive force to the coils 120. Thus, damage to the coils 120 during insertion can be suppressed.

Second Embodiment

Next, a second embodiment of the present disclosure will be described with reference to FIGS. 1, 4, 5, and 11. The second embodiment is different from the first embodiment described above in which both the pressing members 30 and the fall suppression members 40 are configured to be movable in the up-down direction by the pushing device 10. In the second embodiment, the fall suppression members 40 are configured to be movable in the radial direction separately from the pressing members 30. In the second embodiment, components that are similar to those in the first embodiment described above are given the same numerals to omit description.

(Structure of Stator Assembly Apparatus)

As illustrated in FIG. 11, an assembly apparatus 300 for the stator 200 (see FIG. 5) according to the second embodiment includes a pushing device 210 that holds the pressing members 30, and holding devices 220 that hold the fall suppression members 40 (and the movement restriction members 50).

The arm portions 11 of the pushing device 210 are not provided with the holding blocks 14 (see FIG. 1) according to the first embodiment described above, and only the pressing members 30 (pressing rollers 31) are held by the arm portions 11 so as to be rotatable via the shaft member 13. The pressing members 30 press the coil end portions 123 (124) radially outward through up-down movement of the pushing device 210.

The fall suppression members 40 are attached to the holding devices 220. As in the first embodiment described above (see FIG. 4), the fall suppression members 40 are disposed on both sides in the axial direction with respect to the coil assembly 140 so as to correspond to the coil end portions 123 (124) on both sides in the axial direction, although not illustrated. Therefore, the holding devices 220 are also disposed on both sides in the axial direction with respect to the coil assembly 140.

The holding devices 220 are configured such that the fall suppression members 40 are movable in the radial direction of the stator core 110 (coil assembly 140). Here, in the second embodiment, unlike the first embodiment described above, the holding devices 220 enable the fall suppression members 40 on one side (on the Y1 direction side) and the other side (on the Y2 direction side) to be moved along lines L1 and L2, respectively, that extend in the radial direction from the center axis Ax of the stator core. The holding devices 220 are configured such that the fall suppression roller 41 on one side (on the Y1 direction side) and the fall suppression roller 42 on the other side (on the Y2 direction side) are moved independently of each other.

During assembly of the stator 200, the pushing device 210 and the holding devices 220 operate in synchronization with each other. As a result, the fall suppression members 40 are moved radially outward while supporting the coil end portions 123 (124) along with movement of the pressing members 30 toward the radially outer side during pressing. In addition, the holding devices 220 each make the clearance D between the pressing member 30 and the fall suppression member 40 different in accordance with variations in outside diameter R of the coils 120 to be inserted into the slots 113 along with movement of the pressing member 30 toward the radially outer side.

The other components of the second embodiment are the same as those of the first embodiment described above.

Effect of Second Embodiment

In the second embodiment as well, as in the first embodiment described above, the fall suppression members 40 can suppress fall of the coil end portions 123 (124) toward the radially outer side during assembly of the coils 120 to the stator core 110.

In the second embodiment, in addition, as described above, the fall suppression roller 41 on one side (on the Y1 direction side) and the fall suppression roller 42 on the other side (on the Y2 direction side) are configured to be movable independently of each other. Consequently, the clearance between the pressing member 30 and the fall suppression roller 41 and the clearance between the pressing member 30 and the fall suppression roller 42 can be controlled individually even in the case where the outer shape of the coil end portions 123 (124) is warped temporarily in the course in which the outside diameter of the coil end portions 123 (124) is increased along with insertion of the coils 120 into the slots 113 by the pressing members 30. Thus, application of a local load (support force) to the coil end portions 123 (124) can be suppressed effectively.

The other effects of the second embodiment are the same as those of the first embodiment described above.

Third Embodiment

Next, a third embodiment of the present disclosure will be described with reference to FIG. 12. In the third embodiment, unlike the first embodiment described above in which the fall suppression members 40 and the movement restriction members 50 are provided integrally with each other, fall suppression members 340 and a movement restriction member 350 are provided separately from each other. In the third embodiment, components that are similar to those in the second embodiment described above are given the same numerals to omit description.

(Structure of Stator Assembly Apparatus)

Figure 12:
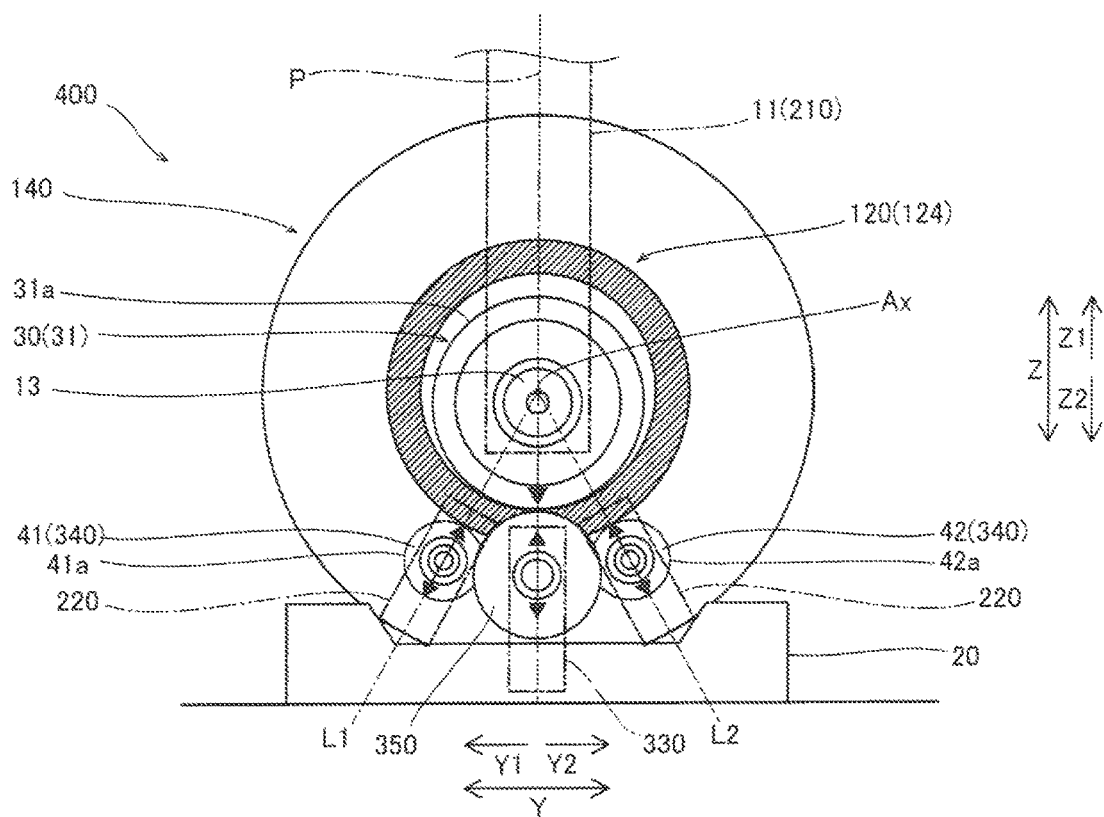
FIG. 12 is a schematic side view illustrating the structure of a stator assembly apparatus according to a third embodiment of the present disclosure.

As illustrated in FIG. 12, an assembly apparatus 400 for the stator 200 (see FIG. 5) according to the third embodiment includes the pushing device 210 which holds the pressing members 30, the holding devices 220 which hold the fall suppression members 340, and a holding device 330 that hold the movement restriction member 350. The holding devices 220 and the holding device 330 are configured to be movable independently of each other.

The fall suppression members 340 of the holding devices 220 include only the fall suppression rollers 41 (42) which are each a single roller that does not have the flange-like portion 51. The holding devices 220 can move the fall suppression rollers 41 (42) in the radial direction.

The holding device 330 is disposed between the holding devices 220 on one side (on the Y1 direction side) and the other side (on the Y2 direction side), for example. The movement restriction member 350 has a flat disc shape, for example. The movement restriction member 350 is not provided with the fall suppression roller 41 (42). The holding device 330 holds the movement restriction member 350 so as to be movable in the radial direction (up-down direction) and movable also in the axial direction (direction in which the center axis Ax extends).

Consequently, the movement restriction member 350 is configured to be moved radially outward (in the direction in which the line segment P extends) by the holding device 330 along with movement of the pressing members 30 toward the radially outer side during pressing. In addition, the movement restriction member 350 is configured to be movable also in the axial direction (X direction) by the holding device 330 in accordance with variations in amount of projection L (see FIG. 10) in the axial direction of the coil end portion 124 from the stator core 110 as in the first embodiment described above (see FIG. 4).

During assembly of the stator 200, the pushing device 210, the holding devices 220, and the holding device 330 operate in synchronization with each other. As a result, pressing of the coil end portions 123 (124) by the pressing members 30, support of the coil end portions 123 (124) by the fall suppression members 340, and restriction of movement of the coil end portions 124 by the movement restriction member 350 are performed in parallel with each other.

The other components of the third embodiment are the same as those of the first embodiment described above.

Effect of Third Embodiment

In the third embodiment as well, as in the first embodiment described above, the fall suppression members 340 can suppress fall of the coil end portions 123 (124) toward the radially outer side during assembly of the coils 120 to the stator core 110.

In the third embodiment, in addition, as described above, the fall suppression members 340 and the movement restriction member 350 are provided separately from each other, and the fall suppression members 340 and the movement restriction member 350 are configured to be movable independently of each other by the holding devices 220 and the holding device 330, respectively. Consequently, the holding devices 220 which include the fall suppression members 340 and the holding device 330 which includes the movement restriction member 350 can be unitized individually to improve the degree of freedom in arrangement of the various units in the assembly apparatus 400. Therefore, the assembly apparatus 400 can be easily provided with three or more fall suppression members 340 or provided with two or more movement restriction members 350, for example, in accordance with the size of the stator 200.

The other effects of the third embodiment are the same as those of the first embodiment described above.

Modification

The embodiments disclosed herein should be considered as exemplary and non-limiting in all respects. The scope of the present disclosure includes all changes (modifications) that fall within the scope of the disclosure and the meaning and scope of equivalence.

In the first to third embodiments described above, for example, the fall suppression members 40 (340) are moved in the radial direction together with the pressing members 30. However, the present disclosure is not limited thereto. In the present disclosure, the fall suppression members may not be moved in the radial direction together with the pressing members. Insertion of the coils (pressing by the pressing members) may be performed to a certain degree with the fall suppression members fixed in radial position, thereafter the pressing may be stopped, and the insertion of the coils may be resumed after the radial position of the fall suppression members is adjusted. The coils may be inserted by repeating such steps.

In the first to third embodiments described above, in addition, the fall suppression members 40 (340) are relatively moved in the radial direction with respect to the pressing members 30 to make the clearance between the pressing members 30 and the fall suppression members 40 (340) different. However, the present disclosure is not limited thereto. In the present disclosure, the fall suppression members may not be relatively moved in the radial direction with respect to the fall suppression members. Insertion of the coils (pressing by the pressing members) may be performed to a certain degree with the fall suppression members fixed in relative radial position with respect to the pressing members, thereafter the pressing may be stopped, and the insertion of the coils may be resumed after the relative radial position of the fall suppression members with respect to the pressing members is adjusted. The coils may be inserted by repeating such steps.

In the first to third embodiments described above, in addition, the pressing rollers 31, the fall suppression rollers 41 (42), and the movement restriction member 350 are configured to be rotatable in a following manner without a drive source along with rotation of the coil assembly 140. However, the present disclosure is not limited thereto. In the present disclosure, the assembly apparatus may be provided with a drive source that rotates the pressing rollers, the fall suppression rollers, and the movement restriction member in accordance with rotational movement of the coil end portions. In this case, the resistance against contact between the pressing rollers, the fall suppression rollers, and the movement restriction member and the coil end portions can be reduced as much as possible. Thus, damage received by the coil end portions during assembly of the stator can be suppressed.

In the first to third embodiments described above, in addition, the fall suppression members 40 (340) are configured to include the fall suppression rollers 41 (42). However, the present disclosure is not limited thereto. In the present disclosure, the fall suppression members may be plate members, rather than rollers.

In the first to third embodiments described above, in addition, the assembly apparatus 100 (300, 400) is provided with the movement restriction members 50 (350). However, the present disclosure is not limited thereto. In the present disclosure, the assembly apparatus may not be provided with the movement restriction members.

The structure of the coil assembly 140 described in relation to the first to third embodiments described above is merely exemplary, and the present disclosure is not limited thereto. For example, a jig that is different in shape from the jig 130 (guide jigs 131) may be used for the coil assembly.

In the first and second embodiments described above, in addition, a conductive wire is wound a plurality of times to form the concentrically wound coils 120. However, the present disclosure is not limited thereto. In the present disclosure, a conductor wire may be bent a plurality of times into a wavy shape to form so-called wave-wound coils. The present disclosure is applicable also to a configuration in which wave-wound coils are pressed radially outward to be inserted into slots as disclosed in Japanese Patent Application Publication No. 2009-268158 (JP 2009-268158 A), for example.

In the first and second embodiments described above, in addition, the coils 120 which are constituted from a rectangular conductive wire are used. However, the present disclosure is not limited thereto. In the present disclosure, coils constituted from a conductive wire with a polygonal cross section or a round wire, rather than a rectangular conductive wire, may also be used.

In the first and second embodiments described above, in addition, the pressing members 30 include the pressing rollers 31. However, the present disclosure is not limited thereto. In the present disclosure, the pressing members may be plate members, rather than rollers.

In the first to third embodiments described above, in addition, the coils 120 are moved radially outward by the support rollers 21 rotating the coil assembly 140 in parallel with local pressing of the coil end portions 123 (124) by the pressing members 30 (pressing rollers 31). However, the present disclosure is not limited thereto. In the present disclosure, as in a modification illustrated in FIG. 13, the coils 120 which are arranged annularly may be inserted into the slots 113 collectively over the entire periphery in the circumferential direction.

Figure 13:
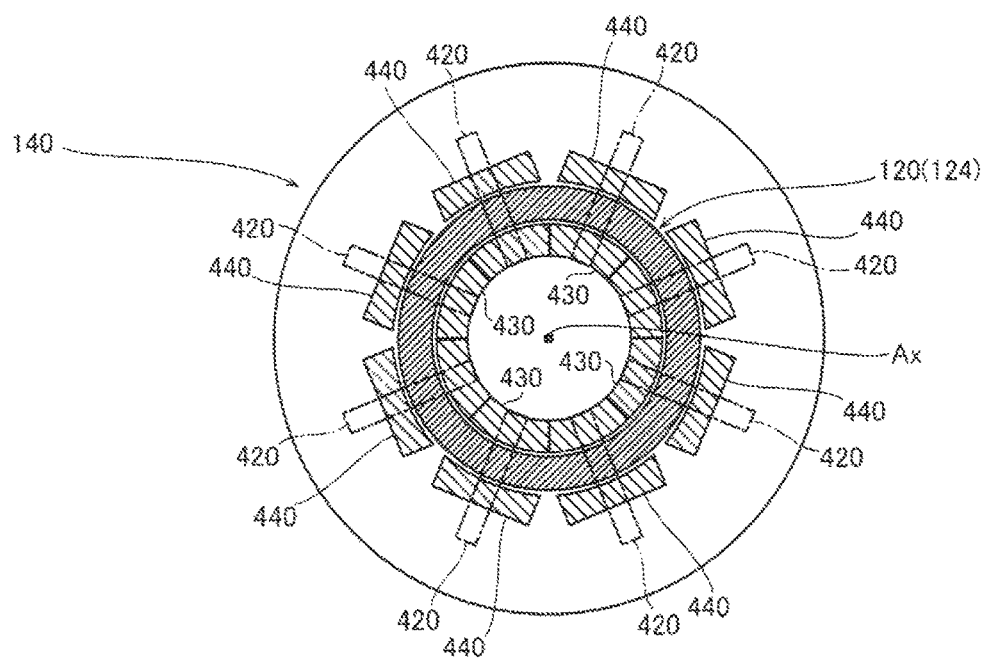
FIG. 13 is a schematic plan view illustrating a state at the time when the assembly of coils is started in a modification of a stator assembly apparatus.
Figure 14:
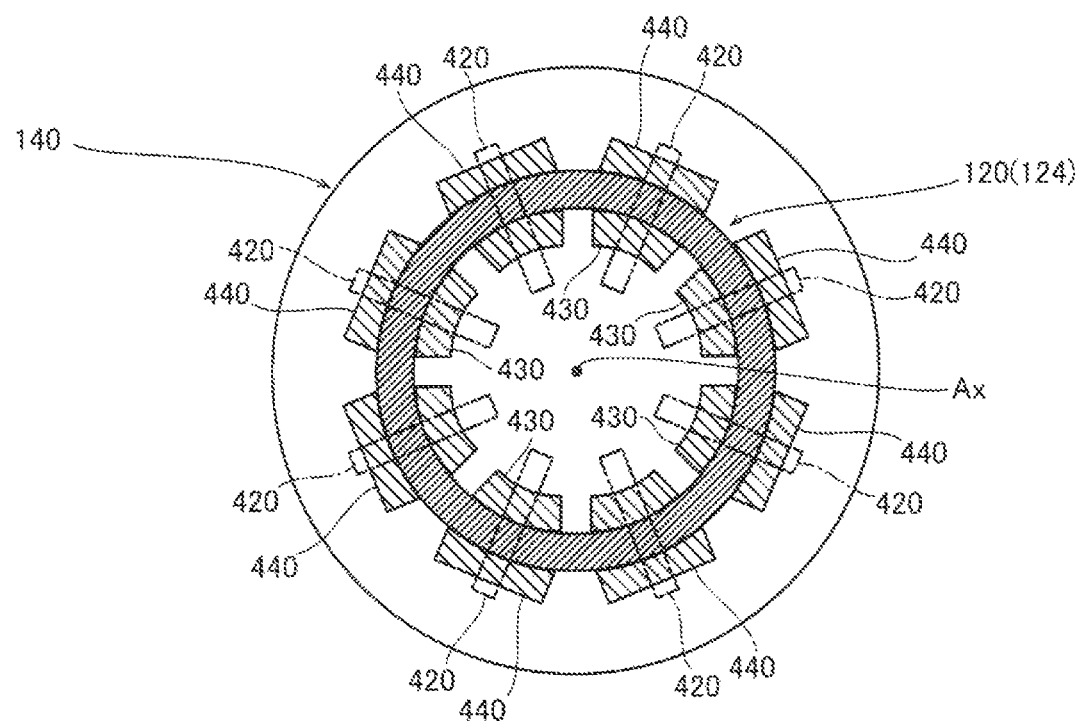
FIG. 14 is a schematic plan view illustrating a state at the time when the assembly of the coils in FIG. 13 is ended.

In the modification illustrated in FIG. 13, pressing members 430 on the inner peripheral side of the coils 120 (coil end portions 124) which are arranged annularly and fall suppression members 440 on the outer peripheral side of the coils 120 may be provided in pairs. The pairs of pressing members 430 and fall suppression members 440 are held by holding devices 420 so as to be movable in the radial direction, for example. The pressing members 430 contact the inner peripheral surfaces of the coil end portions 124 from the inner peripheral side. The fall suppression members 440 contact the outer peripheral surfaces of the coil end portions 124 from the outer peripheral side. In FIG. 13, for convenience of illustration, the pressing members 430 and the fall suppression members 440 are illustrated so as to be slightly spaced from the coil end portions 124. Pairs (in FIG. 13, eight pairs) of pressing members 430 and fall suppression members 440 are disposed at equal angular intervals over the entire periphery in the circumferential direction. When the eight pairs of pressing members 430 and fall suppression members 440 are moved radially outward, the pressing members 430 press the coil end portions 124 radially outward over the entire periphery while the fall suppression members 440 are supporting the coil end portions 124 from the radially outer side over the entire periphery. As a result, as illustrated in FIG. 14, the coils 120 which are arranged circumferentially in the coil assembly 140 are inserted into the slots 113 (see FIG. 7) of the stator core 110 (see FIG. 7) collectively over the entire periphery.

The invention claimed is:

1. A stator assembly method comprising:
    disposing a plurality of coils combined with each other on an inner peripheral side of an annular stator core, the coils each having slot housed portions to be housed in slots provided in an inner periphery of the annular stator core, and coil end portions to be disposed outside of end surfaces of the stator core in an axial direction in which a center axis of the annular stator core extends; and
    inserting the coils into the slots by pressing the coil end portions of the coils from the inner peripheral side toward a radially outer side of the stator core using a presser while suppressing fall of the coil end portions by supporting the coil end portions of the coils from the radially outer side of the stator core using a fall suppressor when the coils are inserted into the slots while increasing a clearance between the slot housed portions by pressing the coil end portions of the coils, which are disposed on the inner peripheral side of the stator core, from the inner peripheral side toward an outer peripheral side of the stator core using the presser.

2. The stator assembly method according to claim 1, wherein inserting the coils includes moving the fall suppressor radially outward along with movement of the presser toward the radially outer side during pressing.

3. The stator assembly method according to claim 2, wherein inserting the coils includes making a clearance between the presser and the fall suppressor different in accordance with variations in shape of the coils to be inserted into the slots along with the movement of the presser toward the radially outer side.

4. The stator assembly method according to claim 3, wherein:
    inserting the coils is a step of relatively moving the stator core with respect to the presser in a rotational direction about the center axis while pressing the coil end portions from the inner peripheral side toward the radially outer side of the stator core using the presser;
    the presser is a pressing roller that is rotated along with movement of the stator core in the rotational direction; and
    the fall suppressor is fall suppression rollers that are rotated along with movement of the coil end portions in the rotational direction while supporting the coil end portions.

5. The stator assembly method according to claim 4, wherein:
    disposing the coils on the inner peripheral side of the stator core includes attaching guide jigs to the plurality of coils which have been combined with each other, the guide jigs including guide portions that guide the slot housed portions into the slots; and
    inserting the coils includes inserting the slot housed portions into the slots while increasing a clearance between the slot housed portions in a circumferential direction by pressing the coil end portions radially outward using the presser and by moving the slot housed portions radially outward along the guide portions of the guide jigs.

6. The stator assembly method according to claim 3, wherein:
    disposing the coils on the inner peripheral side of the stator core includes attaching guide jigs to the plurality of coils which have been combined with each other, the guide jigs including guide portions that guide the slot housed portions into the slots; and
    inserting the coils includes inserting the slot housed portions into the slots while increasing a clearance between the slot housed portions in a circumferential direction by pressing the coil end portions radially outward using the presser and by moving the slot housed portions radially outward along the guide portions of the guide jigs.

7. The stator assembly method according to claim 2, wherein:
    inserting the coils is a step of relatively moving the stator core with respect to the presser in a rotational direction about the center axis while pressing the coil end portions from the inner peripheral side toward the radially outer side of the stator core using the presser;

the presser is a pressing roller that is rotated along with movement of the stator core in the rotational direction; and the fall suppressor is fall suppression rollers that are rotated along with movement of the coil end portions in the rotational direction while supporting the coil end portions.

8. The stator assembly method according to claim 2, wherein:

disposing the coils on the inner peripheral side of the stator core includes attaching guide jigs to the plurality of coils which have been combined with each other, the guide jigs including guide portions that guide the slot housed portions into the slots; and inserting the coils includes inserting the slot housed portions into the slots while increasing a clearance between the slot housed portions in a circumferential direction by pressing the coil end portions radially outward using the presser and by moving the slot housed portions radially outward along the guide portions of the guide jigs.

9. The stator assembly method according to claim 1, wherein:

inserting the coils is a step of relatively moving the stator core with respect to the presser in a rotational direction about the center axis while pressing the coil end portions from the inner peripheral side toward the radially outer side of the stator core using the presser;

the presser is a pressing roller that is rotated along with movement of the stator core in the rotational direction; and the fall suppressor is fall suppression rollers that are rotated along with movement of the coil end portions in the rotational direction while supporting the coil end portions.

10. The stator assembly method according to claim 1, wherein:

disposing the coils on the inner peripheral side of the stator core includes attaching guide jigs to the plurality of coils which have been combined with each other, the guide jigs including guide portions that guide the slot housed portions into the slots; and inserting the coils includes inserting the slot housed portions into the slots while increasing a clearance between the slot housed portions in a circumferential direction by pressing the coil end portions radially outward using the presser and by moving the slot housed portions radially outward along the guide portions of the guide jigs.

11. A stator assembly apparatus comprising:

a presser that presses coil end portions of a plurality of coils combined with each other from an inner peripheral side toward a radially outer side of an annular stator core to insert the coils into slots while increasing a clearance between slot housed portions, the coils each having the slot housed portions to be housed in the slots provided in an inner periphery of the annular stator core, and the coil end portions to be disposed outside of end surfaces of the stator core in an axial direction in which a center axis of the annular stator core extends; and fall suppressors that suppress fall of the coil end portions by supporting the coil end portions from the radially outer side when the coil end portions are pressed radially outward by the presser.

12. The stator assembly apparatus according to claim 11, wherein the fall suppressors are configured to be moved radially outward while supporting the coil end portions along with movement of the presser toward the radially outer side during pressing.

13. The stator assembly apparatus according to claim 12, wherein the fall suppressors are configured to make a clearance between the presser and the fall suppressors different in accordance with variations in shape of the coils to be inserted into the slots along with the movement of the presser toward the radially outer side.

14. The stator assembly apparatus according to claim 13, wherein:

the presser is a pressing roller that is rotated along with relative movement of the stator core with respect to the presser in a rotational direction about the center axis;

the fall suppressors are fall suppression rollers that are rotated along with movement of the coil end portions in the rotational direction while supporting the coil end portions; and the fall suppression rollers include a first fall suppression roller disposed on one side with respect to a line segment that extends in a pressing direction in which the presser presses the coil end portions, and a second fall suppression roller disposed on the other side with respect to the line segment.

15. The stator assembly apparatus according to claim 14, further comprising:

guide jigs attached to the plurality of coils which have been combined with each other and including guide portions that guide the slot housed portions into the slots, wherein the slot housed portions are inserted into the slots while increasing a clearance between the slot housed portions in a circumferential direction by pressing the coil end portions radially outward using the presser and by moving the slot housed portions radially outward along the guide portions of the guide jigs.

16. The stator assembly apparatus according to claim 13, further comprising:

guide jigs attached to the plurality of coils which have been combined with each other and including guide portions that guide the slot housed portions into the slots, wherein the slot housed portions are inserted into the slots while increasing a clearance between the slot housed portions in a circumferential direction by pressing the coil end portions radially outward using the presser and by moving the slot housed portions radially outward along the guide portions of the guide jigs.

17. The stator assembly apparatus according to claim 12, wherein:

the presser is a pressing roller that is rotated along with relative movement of the stator core with respect to the presser in a rotational direction about the center axis;

the fall suppressors are fall suppression rollers that are rotated along with movement of the coil end portions in the rotational direction while supporting the coil end portions; and the fall suppression rollers include a first fall suppression roller disposed on one side with respect to a line segment that extends in a pressing direction in which the presser presses the coil end portions, and a second fall suppression roller disposed on the other side with respect to the line segment.

18. The stator assembly apparatus according to claim 12, further comprising:

guide jigs attached to the plurality of coils which have been combined with each other and including guide portions that guide the slot housed portions into the slots, wherein the slot housed portions are inserted into the slots while increasing a clearance between the slot housed portions in a circumferential direction by pressing the coil end portions radially outward using the presser and by moving the slot housed portions radially outward along the guide portions of the guide jigs.

19. The stator assembly apparatus according to claim 11, wherein:

the presser is a pressing roller that is rotated along with relative movement of the stator core with respect to the presser in a rotational direction about the center axis;

the fall suppressors are fall suppression rollers that are rotated along with movement of the coil end portions in the rotational direction while supporting the coil end portions; and the fall suppression rollers include a first fall suppression roller disposed on one side with respect to a line segment that extends in a pressing direction in which the presser presses the coil end portions, and a second fall suppression roller disposed on the other side with respect to the line segment.

20. The stator assembly apparatus according to claim 11, further comprising:

guide jigs attached to the plurality of coils which have been combined with each other and including guide portions that guide the slot housed portions into the slots, wherein the slot housed portions are inserted into the slots while increasing a clearance between the slot housed portions in a circumferential direction by pressing the coil end portions radially outward using the presser and by moving the slot housed portions radially outward along the guide portions of the guide jigs.

* * * * *